Oct. 22, 1963  F. K. DAGGETT ETAL  3,107,697
FLEXIBLE CONDUIT
Filed Feb. 2, 1959
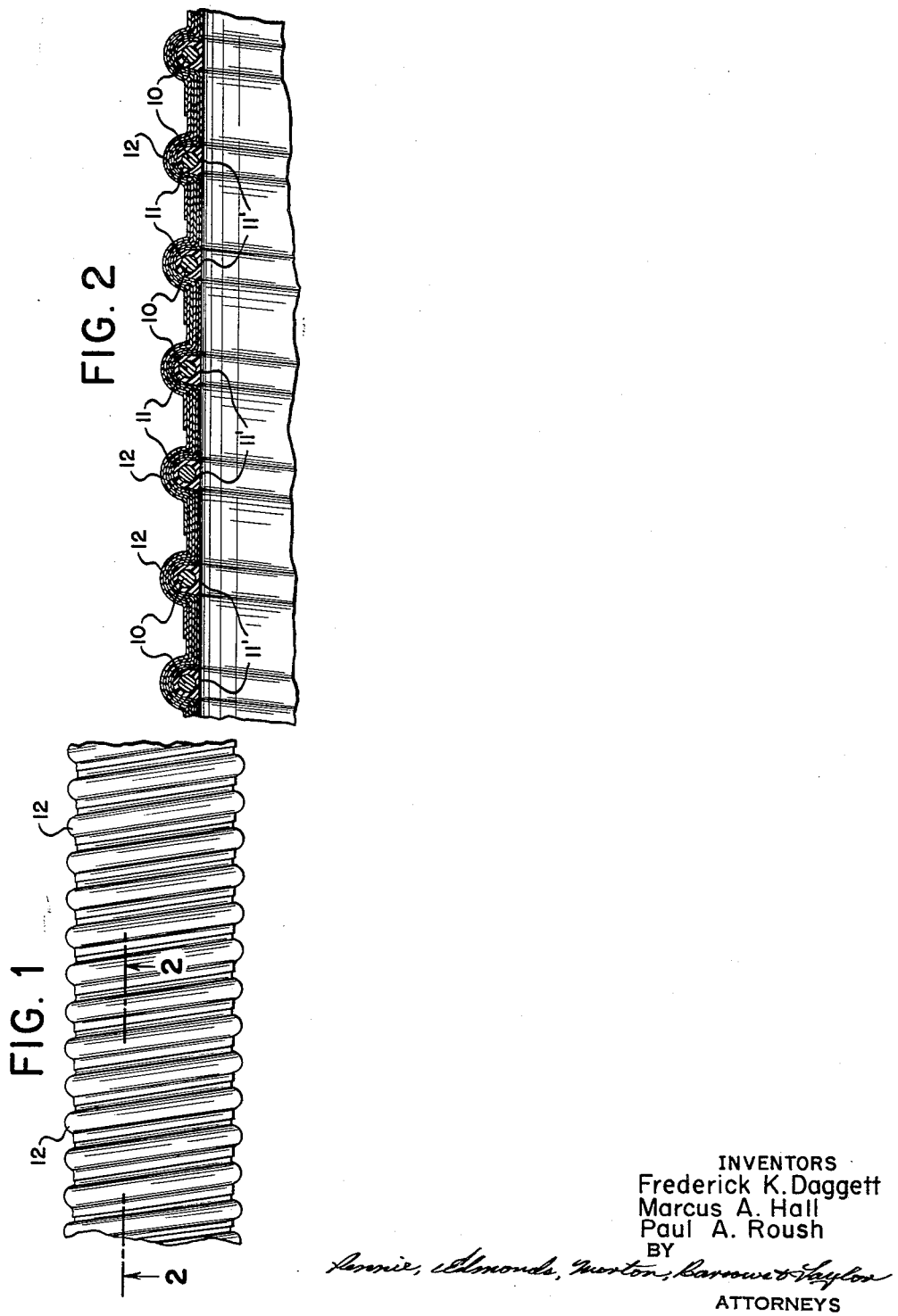
INVENTORS
Frederick K. Daggett
Marcus A. Hall
Paul A. Roush
BY
ATTORNEYS

United States Patent Office 3,107,697
Patented Oct. 22, 1963

3,107,697
FLEXIBLE CONDUIT
Frederick K. Daggett, Old Saybrook, Marcus A. Hall, Branford, and Paul A. Roush, New Haven, Conn., assignors to Flexible Tubing Corporation, Guilford, Conn., a corporation of Connecticut
Filed Feb. 2, 1959, Ser. No. 790,461
1 Claim. (Cl. 138—131)

This invention relates to flexible conduit and particularly to such a conduit especially useful as suction pipe for domestic and industrial vacuum cleaners. The conduit is smooth bore, that is, its inner wall surface is substantially smooth, and is of such construction that even under extreme bend—for example an inside bend radius of 0.5 times its diameter—it loses no appreciable amount of cross sectional area and retains good air flow characteristics with minimum friction loss or air flow loss due to turbulence.

The basic construction of our novel flexible conduit comprises a coated wire in helix form and a covering completely surrounding the coated wire helix. Both the wire coating and the covering are of elastomeric material. The portions of the covering between the convolutes and the wire coating facing the interior of the helix are in substantially continuous side-by-side contact and coplanar, whereby the conduit has a substantially smooth, uninterrupted inner surface. The covering material is bonded to the wire coating facing the exterior of the helix and is advantageously made of an elastomeric material compatible with the wire coating whereby the bond between it and the wire coating may be accomplished by fusion accomplished either by the application of heat or solvents, or both. Furthermore for reasons that will hereinafter be set forth in more detail, we prefer to employ a multi-ply covering helically wound about the coated wire helix with successive convolutes overlapping one or more previous convolutes. The thickness of the covering relative to the diameter of the wire employed is advantageously small whereby the outer surface of the conduit has a relatively high convolute by which, as will be explained below, maximum flexibility may be achieved while at the same time the inner surface will remain relatively smooth.

Broadly stated, the new flexible conduit comprises a helix of wire and an elastomeric coating on and surrounding the wire throughout the length thereof. A multi-ply flexible covering comprising a helical wrapping of an elastomeric strip is disposed about the helix of wire. This strip is under in situ tension which varies across the width of the strip. Each convolution of the strip overlaps a plurality of adjacent convolutes thereof. The coating and the plies of the covering are fused together and the plies are partially fused to one another. The pitch and direction of the helical wrapping are the same as that of the wire. Finally, the inner surface of the flexible conduit is defined by portions of the wire coating and of the flexible covering and also is substantially smooth.

This new flexible conduit may be formed by wrapping its respective elements helically about a mandrel. Tension, heat or solvents, or all of them, may be applied to the various elements of the conduit as they are helically wrapped in this manner so that the inner surface of the conduit is substantially smooth, the covering is pulled down between the convolutes of the coated wire, the wire coating is fused to the covering, and the plies of the covering are partially fused to one another leaving the strip forming the plies under in situ tension which varies across the width of the strip from a maximum where the plies are not fused to a minimum (perhaps zero) where they are fused.

It is contemplated by our invention that a flexible conduit manufactured in accordance therewith may have different extensibility characteristics. Hence, one type of flexible conduit, the manufacture of which we contemplate, will be substantially non-changeable in length, that is, it will be of substantially fixed length except insofar as longitudinal unit extensibility is necessary to provide for good bend flexibility. Another type of conduit which may be manufactured in accordance with our invention, however, may be longitudinally quite elastic. Such a conduit, for example, may, when under no external stress, have a length of, say, 3 to 4 feet and be extensible, when subjected to longitudinal tension, to a length of 8 or more feet. The degree of extensibility depends, as will be pointed out below, primarily upon the manner in which the coated wire is wound upon the mandrel and the nature of its precurved configuration just prior to application to the mandrel.

For a more detailed understanding of our invention, reference may be made to the following specific description:

FIG. 1 is a fragmentary view of a length of flexible conduit made in accordance with the invention; and FIG. 2 is a sectional view taken on line 2—2 of FIG. 1 showing the details of construction of the conduit of FIG. 1.

Referring to FIGS. 1 and 2, there is disclosed a preferred form of flexible conduit according to our invention. It comprises a wire 10 formed in a helix, the wire 10 being coated throughout its length with a plastic coating 11. The coated wire helix is enclosed within a covering formed by helically wrapping thereon a plastic strip material 12. In the illustrated conduit, the pitch of the wire helix and that of the covering material strip is substantially the same and the width of the covering material strip is sufficient to cover about five convolutes of the wire helix whereby the covering material is uniformly 5 plies thick throughout the length of the conduit.

While various materials may be employed, in the illustrated example we have employed for wire 10 high carbon steel medium spring wire. The coating 11 is a plasticized vinyl chloride-acetate copolymer resin extruded onto the wire and having at the time of extrusion a circular cross section. The covering material strip is a high molecular weight vinyl chloride-vinyl acetate copolymer plasticized with a suitable plasticizing material. An effort is made in its manufacture to avoid local stresses, strains and the like. Both the coating 11 and the covering material 12, as will be clear, are compatible and may be adhered together as hereinafter described both by the use of suitable solvents as well as by fusion resulting from a suitable heat treatment.

It will be noted in the cross sectional view of FIG. 2 that in the finished conduit the cross sectional shape of the wire coating 11 has been altered. The circular outer surface of the coating has been flattened as indicated at 11′ and material therefrom has flowed axially of the conduit in both directions to fill the spaces that would otherwise exist between the covering material and the inner portions of coating 11. This results in a substantially smooth and completely uninterrupted planar inner surface for the conduit whereby fluid passing through it is subjected to minimum friction losses as well as minimum flow loss due to turbulence that would be set up by any interruptions or lack of continuity in the smoothness of the inner surface.

While in FIG. 2 the various plies of covering material 12 are illustrated as being distinctly separate, they are rather in the finished conduit partially fused together both as a result of the use of a solvent applied to the strip material as it is wound upon the coated wire helix and the subsequent heat treatment. In addition, there is at least partial fusion between the innermost covering material ply and the wire coating. The covering material strip is applied under external tension which results in portions of it being located deep into the spaces between the convolutes of the coated wire. This results in the conduit having what may be termed a relatively high convolute. This contributes greatly to the flexibility of the conduit by reason of the fact that in flexing it permits the convolutes of the coated wire helix to migrate toward each other while the inside surface of the conduit remains relatively smooth. The thickness of the covering material in FIG. 2 is exaggerated in order to clearly illustrate the multi-ply construction and in an actual flexible conduit in accordance with the invention will not extend outwardly beyond the center of the wire.

The elements of the conduit may be heated during fabrication by one or both of induction heat from a mandrel about which they are wrapped or radiant heating from an exterior source, or by any other suitable means. In covering the flexible conduit of FIGS. 1 and 2 the helical direction of the covering material strip 12 is preferably the same or substantially the same as the helical direction of the coated wire. The number of layers of covering material strip in the finished product depends upon the width of the strip material employed and upon the number of strips successively applied to form the covering.

The wire 10 is so precurved before it is applied to a mandrel on which the conduit is formed that the extensibility of the conduit can vary. If the precurving creates a tendency in the coated wire helix to expand in length, the final rest configuration of the conduit will be as shown in FIG. 2 with the covering material 12 pulled straight between the wire convolutes and the conduit will be longitudinally compressible but not extensible. If the precurving creates a tendency in the wire helix to contract in length, the covering material 12 in the final rest configuration of the conduit will be folded somewhat between the wire convolutes and the conduit would be both longitudinally compressible and extensible.

The strip of covering material 12 is helically wrapped under tension in order to lie between the convolutes of the wire helix. The amount of tension, heat and solvent are controlled so that the plies of the covering material fuse to the coating 11 on the wire but fuse together only partially. Therefore, in the finished conduit the plies of the covering material 12 remain under in situ tension where they have not been fused together, and where they have been fused together their internal tensile stress is relieved. As a result, the in situ tension in the covering strip varies across the width of the strip. In practice, it has been found that the radial pressure from one ply to the next is considerably less at the inclined shoulder zones alongside the wire convolutes than it is over the crown of those convolutes and in the flat web portion of the covering between them. When partial fusion is effected by reducing heat and amount of solvent, these shoulder zones of least radial pressure will be where the plies of the covering remain in tension and do not fuse together. Elsewhere, the plies will fuse into a stress-relieved monolithic wall. The advantage gained by this partial fusion is that the conduit is substantially increased in flexibility because its plies can move with respect to one another in the non-fused shoulder zones where they remain under in situ tension. This increase in flexibility is achieved without loss of tensile or fatigue strength.

We claim:

A flexible conduit comprising a helix of wire, an elastomeric coating on and surrounding the wire throughout the length thereof, and a multi-ply flexible covering comprising a helical wrapping of an elastomeric strip about the helix of wire, said strip being under in situ tension which varies across the width of the strip, each convolution of said strip overlapping a plurality of adjacent convolutes thereof, said coating and the plies of said covering being fused together and said plies being partially fused to one another, the pitch and direction of said helical wrapping being the same as that of said wire, the inner surface of the flexible conduit being defined by portions of said wire coating and of said flexible covering and being substantially smooth.

References Cited in the file of this patent

UNITED STATES PATENTS

| | | |
|---|---|---|
| 1,472,435 | Palmer | Oct. 30, 1923 |
| 1,974,285 | Maclachlan | Sept. 18, 1934 |
| 2,486,387 | Bringolf | Nov. 1, 1949 |
| 2,674,297 | Greenwald | Apr. 6, 1954 |
| 2,782,803 | Rothermel et al. | Feb. 26, 1957 |
| 2,797,730 | Martin | July 2, 1957 |
| 2,813,573 | Roberts | Nov. 19, 1957 |
| 2,858,854 | Daggett | Nov. 4, 1958 |
| 2,890,723 | Evert | June 16, 1959 |
| 2,898,942 | Rothermel | Aug. 11, 1959 |

FOREIGN PATENTS

| | | |
|---|---|---|
| 751,621 | Germany | May 18, 1954 |